United States Patent
Hutchinson

(12) 
(10) Patent No.: US 6,697,636 B1
(45) Date of Patent: Feb. 24, 2004

(54) RADIO TELEPHONE BUZZER

(75) Inventor: Mark Hutchinson, Hampshire (GB)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/507,382

(22) Filed: Feb. 18, 2000

(30) Foreign Application Priority Data

Feb. 22, 1999 (GB) .............................................. 9904001

(51) Int. Cl.$^7$ ................................................ H04M 1/00
(52) U.S. Cl. ................. 455/550.1; 455/90.3; 455/575.1
(58) Field of Search .............................. 455/550, 575, 455/90, 350; 379/433; 381/386, 152, 71.7, 345, 395

(56) References Cited

U.S. PATENT DOCUMENTS

| 5,909,490 A | * | 6/1999 | Sololich et al. | ............. | 379/433 |
| 6,265,965 B1 | * | 7/2001 | Lee | .......................... | 340/388.1 |
| 6,374,120 B1 | * | 4/2002 | Krauss | .................... | 455/550.1 |

FOREIGN PATENT DOCUMENTS

GB        2293518        3/1996

\* cited by examiner

*Primary Examiner*—Sinh Tran
*Assistant Examiner*—Huy D Nguyen
(74) *Attorney, Agent, or Firm*—Perman & Green, LLP

(57) ABSTRACT

A portable radio communication device comprising a housing and a buzzer that rings on activation to alert a user of an event, the buzzer being disposed adjacent the inner surface of the housing and next to an audio outlet orifice for the buzzer provided in the body cover member, wherein the housing has a channelled recess provided in its outer surface in the area of the audio outlet orifice.

11 Claims, 2 Drawing Sheets

RADIO TELEPHONE BUZZER

BACKGROUND OF THE INVENTION

The present invention relates to portable radio communication devices, and more particularly to mounting arrangements for ringer buzzers for such devices.

Ringer buzzers, sometimes simply called buzzers, are the audio transducers in a mobile communication device such as a portable radiotelephone which ring on activation to alert the user of an incoming call or other event. Typically, in the mobile phone a buzzer is mounted directly onto one of the printed circuit boards (PCB's) and once the PCB is assembled in relation to the phone housing the buzzer is located next to an orifice in the housing through which the ringer sound is emitted when the buzzer is activated. The PCB's are mounted in the phone by fixing them into the rear cover member of the housing, for example by screwing them down in the vertical direction. The body or orifice support for the buzzer is provided in the rear face of the cover member and therefore sealing the buzzer against the rear cover in the vertical direction is straight forward because it is brought into alignment with the seal and the orifice in the vertical direction. This is because the sound outlet is at the rear of the phone.

The drawback of such an arrangement between the buzzer and cover member is that because the sound outlet is on the back face of the phone, if the phone is placed on a table or pushed against the users body, for example in a pocket, then the sound outlet port becomes blocked (either by the surface of the table or the body) and this can seriously effect the buzzer audio output from the phone. This obviously in turn makes it harder for the user to hear the buzzer when it is ringing, which could lead to missed calls.

One solution that has been used to overcome this problem is to provide the buzzer orifice at the side of the phone. In this way, when a phone is laid flat on a table surface, the buzzer is directed sideways from the phone and is therefore not obstructed. This type of buzzer again is initially mounted on a PCB and the PCB is assembled by lowering it in a vertical direction into the cover member of the phone, with the buzzer being received in a sealing boot of the phone. This arrangement is shown in FIG. 1 of the accompanying drawings. As is apparent, the buzzer needs to be sealed in a horizontal direction against the side of the phone, while only compressing the parts concerned in a vertical direction. The result is either poor sealing or a clash of the parts as they are slid past one another making assembly difficult.

SUMMARY OF THE INVENTION

Against this background, the present invention seeks to overcome the difficulties with the prior art buzzers outlined above. Accordingly, the present invention provides a portable radio communication device comprising a housing and a buzzer that rings on activation to alert a user of an event, the buzzer being disposed adjacent the inner surface of the housing and next to an audio outlet orifice for the buzzer provided in the body cover member, wherein the housing has a channelled recess provided in its outer surface in the area of the audio outlet orifice.

By means of the invention, even if the communication apparatus is laid flat on for example a table their will be a duct for allowing the sound produced by the buzzer to be outletted to the surrounding environment. In effect, the duct is defined by the channel recess and the surface of the table. As a result, such communication apparatus would benefit in that the sound of the buzzer would not be obstructed or muffled in such circumstances.

Furthermore, because the audio outlet orifice is provided in the rear surface of the cover member, sealing of the buzzer can be effected in a vertical direction, i.e. in a plane parallel to PCB mounting.

BRIEF DESCRIPTION OF THE DRAWINGS

The present invention will now be described by way of example with reference to the accompanying drawings in which.

DETAILED DESCRIPTION OF THE INVENTION

Figure 1:
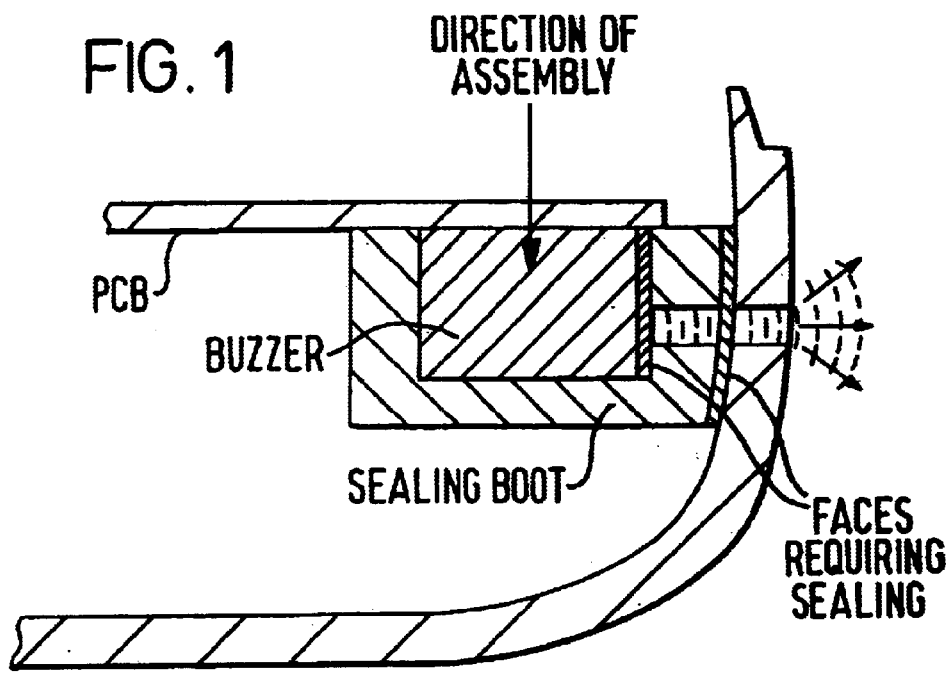
FIG. 1 illustrates a prior art arrangement for mounting a buzzer in a radio telephone.
Figure 2:
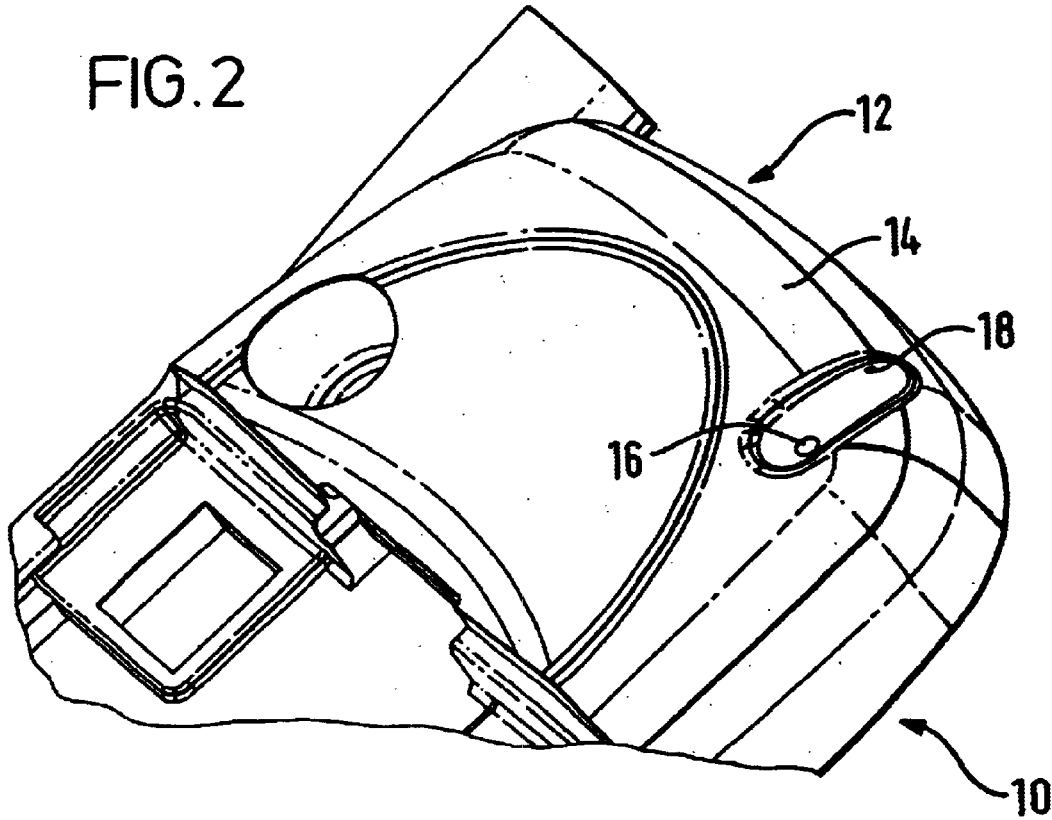
FIG. 2 is a perspective view of a housing cover member incorporating a channelled recess in accordance with the present invention.

Referring initially to FIG. 2 there is shown a back cover member 10 of a radiotelephone.

The back cover member 10 is conveniently moulded from plastics material. It is designed with a great number of formations to house for example a PCB and receive the battery. Towards the upper end of the rear surface of the back cover member 10 near the corner formed where the top side 12 meets the rear surface 14 and spaced downwards from the topside, there is provided an outlet orifice port 16 for a buzzer ringer. As is apparent from FIG. 2, in the area of the back cover member 10 surrounding the audio outlet orifice 16, the rear surface 14 thereof has a scooped out recess 18.

Figure 3:
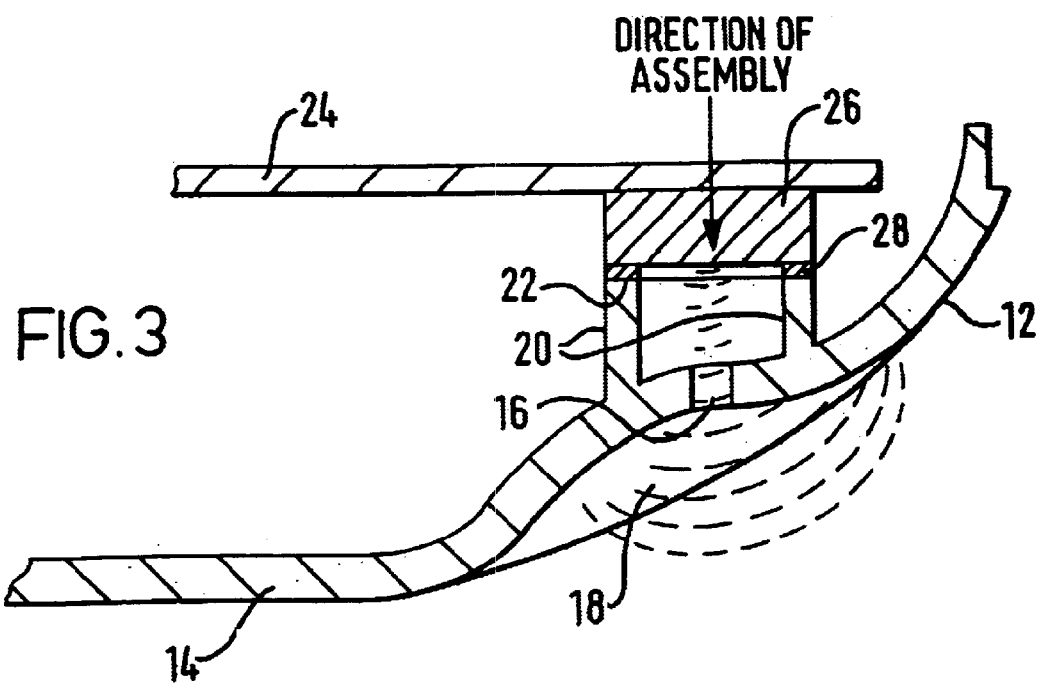
FIG. 3 is a side-on sectional view of the buzzer mounting arrangement of the present invention.

The sectional view of FIG. 3 illustrates the profile of the scooped out recess 18 in greater detail. The audio outlet orifice 16 is located substantially centrally in relation to the scooped out recess 18. The wall of the back cover member 10 is indented and follows a smooth inwardly curved "S" profile. The recess 18 has a generally concave configuration that extends lengthwise to define a channelled recess which extends from below the orifice 16 to the edge 12 of the top side surface of the radiotelephone. Accordingly, when the radiotelephone is placed flat on a surface such as a desk or table or in a briefcase the scooped out recess 18 together with the flat surface forms an audio passageway which acts to guide the sound from the orifice 16 out into the surrounding environment.

Referring still to FIG. 3, the sectional view shows a formation that straddles the audio outlet orifice 16 which extends inwardly from the internal surface of the cover member 10, formations which from FIG. 3 appear to be a pair of legs 20. These however in the preferred embodiment constitute a continuous annular wall 20. The annular wall 20 is so constructed that the rim 22 presents is a flat ring with a plane substantially parallel to the plane of the radiotelephone. Because the location of the annular wall 20 is in the area of the recessed surface contour, the depth of the annular wall that forms it is graded, being deeper on one side than the other, so as to provide the flat rim surface 22.

During the assembly process the PCB 24 from which the buzzer 26 depends, is lowered in a vertical axis into the back cover member 10, in such a manner that the buzzer 26 is aligned with the annular wall 20. Once the buzzer 26 is located against the rim 22 of annular wall 20, the PCB 24 is fixed in relation to the back cover member 10 by any convenient means such as screws. In this way, the buzzer 26 is fixed in relation to the annular wall 20. Sandwiched between the abutting surface of the buzzer 26 and the rim 22 of the annular wall 20 there is provided an annular sealing ring 28, which acoustically seals the buzzer in an outward direction thereby preventing buzzer sound leaking back into the inside of the radiotelephone. Sealing is thereby effected in the direction in which the PCB board and buzzer are assembled into the radiotelephone.

In operation, when the buzzer 26 is activated the buzzer sound will be emitted and emerge from the outlet orifice 16, be transmitted into the scooped recess 18 and outwards away from the radiotelephone. The recessed nature of the back cover member ensures that the outlet orifice is not closed when the radiotelephone is on or pressed against a flat surface.

Figure 4:
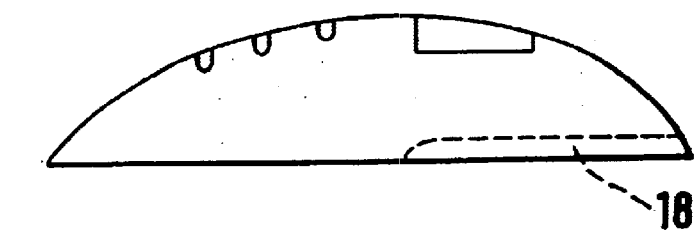
FIG. 4 illustrates alternative constructions of portable radio communication devices including a recess of the present invention.
Figure 4:
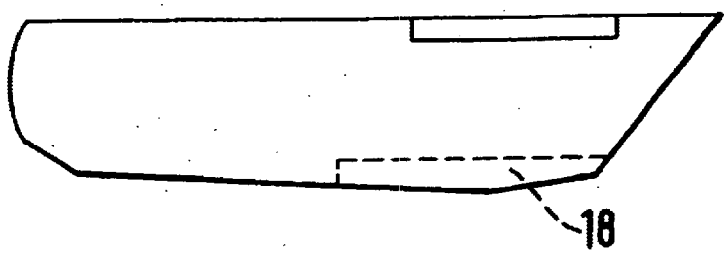

The present invention may be embodied in other specific forms without departing from its essential attributes. For example the recess may conveniently take the form of a groove or channel. Also, instead of the buzzer being located next to an audio outlet port in the back cover member, it may well be that it is located in relation to the front cover member of the radio telephone if the audio outlet port is provided in the front cover member, in which case the scooped out recess is provided in the outer surface wall of the front cover member. Alternative constructions of portable radio communication devices utilising with advantage the present invention are depicted in FIG. 4. Accordingly reference should be made to the appended claims and other general statement herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel features or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A portable communication device comprising:

a housing for the telephone device;

an audio output device mounted adjacent an inner surface of the housing and an audio outlet orifice port;

wherein an area of a back cover member of the housing surrounding the audio outlet orifice has a recessed shape that defines a channel when abutted against a substantially planar surface;

wherein the channel forms an audio passage way that is adapted to guide sound from the orifice out into a surrounding environment.

2. The device of claim 1 wherein the area of the back cover member of the housing surrounding the audio outlet orifice has a shape following a inwardly curved S profile.

3. The device of claim 1 wherein the recessed shape is a concave shape that prevents the orifice from being blocked when the back cover member is placed against a substantially flat surface.

4. The device of claim 1 wherein the audio outlet orifice is located in the back cover near a corner formed where a top side of the back cover meets a rear surface of the cover, and spaced downwards from the topside.

5. The device of claim 1 wherein the audio outlet orifice is located substantially centrally in relation to the concave shape of the area of the back cover surrounding the audio outlet orifice.

6. The device of claim 1 wherein said channel extends from below the orifice to an edge of a top side surface of the portable telephone device.

7. The device of claim 1 wherein the channel forms an audio passageway that is adapted to guide sound from the orifice out into a surrounding environment.

8. The device of claim 1 wherein when the back cover member is abutted against said substantially flat surface, a void is formed between an outer surface of the area of the back cover surrounding the audio outlet orifice and the flat surface.

9. A portable telephone device comprising:

a housing for the telephone device having a front cover and a back cover;

a buzzer mounted inside the housing against the back cover, the buzzer being aligned with an opening in the back cover adapted to allow sound from the buzzer to pass through the opening and into a surrounding environment;

wherein an exterior portion of the back cover surrounding the opening is recessed so that when the back cover is placed against a substantially flat surface, a void that is formed allows the sound to pass into the surrounding environment.

10. The device of claim 9 wherein the exterior portion of the back cover surrounding the opening has a concave shape.

11. The device of claim 9 wherein the opening in the back cover is oriented substantially perpendicular to a front surface of the buzzer.

* * * * *